United States Patent
Trumbull (10) Patent No.: US 8,700,880 B2
(45) Date of Patent: Apr. 15, 2014

(54) DYNAMIC TRAMPOLINE AND STRUCTURED CODE GENERATION IN A SIGNED CODE ENVIRONMENT

(71) Applicant: Apple Inc., Cupertino, CA (US)

(72) Inventor: Benjamin C. Trumbull, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/673,757

(22) Filed: Nov. 9, 2012

(65) Prior Publication Data

US 2013/0067246 A1 Mar. 14, 2013

Related U.S. Application Data

(63) Continuation of application No. 12/249,868, filed on Oct. 10, 2008, now Pat. No. 8,312,249.

(51) Int. Cl.
*G06F 13/14* (2006.01)
(52) U.S. Cl.
USPC ........... 711/203; 711/206; 711/163; 711/164; 380/264
(58) Field of Classification Search
USPC ................... 711/203, 206, 163, 164; 380/264
See application file for complete search history.

(56) References Cited

U.S. PATENT DOCUMENTS

| | | | |
|---|---|---|---|
| 5,481,706 A * | 1/1996 | Peek | 710/200 |
| 5,890,222 A | 3/1999 | Agarwal et al. | |
| 6,247,099 B1 | 6/2001 | Skazinski et al. | |
| 6,886,102 B1 | 4/2005 | Lyle | |
| 2001/0047438 A1 * | 11/2001 | Forin | 710/18 |
| 2002/0063891 A1 * | 5/2002 | Ueda et al. | 358/1.15 |
| 2008/0028170 A1 * | 1/2008 | Clinick et al. | 711/162 |

* cited by examiner

*Primary Examiner* — Jae Yu
(74) *Attorney, Agent, or Firm* — Blakely, Sokoloff, Taylor & Zafman LLP (57) ABSTRACT

A method and apparatus for performing a function based on an executable code in response to receiving a request including function parameters are described. The executable code may be validated when loaded in a memory according to a signature statically signed over the executable code. A data location in the memory for storing the function parameters may be determined according location settings included inside the executable code. A target code location for storing a copy of the executable code may be determined based on the location parameters and the determined data location. A function is performed by executing the executable code from the target code location referencing the stored function parameters.

9 Claims, 9 Drawing Sheets

DYNAMIC TRAMPOLINE AND STRUCTURED CODE GENERATION IN A SIGNED CODE ENVIRONMENT

This application is a divisional of co-pending U.S. patent application Ser. No. 12/249,868, filed on Oct. 10, 2008, entitled "Dynamic Trampoline and Structured Code Generation in a Signed Code Environment."

The present invention relates generally to secure computing. More particularly, this invention relates to dynamic code generation in a signed code environment.

BACKGROUND

Dynamically generated trampolines have been employed for increasing flexibility and providing features like Objective-C dynamic properties, such as Core Data and a number of technologies on MacOS X. As functions that call other functions, trampolines are mostly used for the purpose of currying in languages like C, C++ and Objective-C. However, traditional trampolines may not be compatible with new generations of operation systems, such as iPhone OS.

For example, a tightly controlled operation environment restricts executable codes to be statically signed during build time and verified during runtime. Typically, a traditional trampoline generates executable codes dynamically. As a result, a secure operating environment may not allow a traditional trampoline to execute as dynamically generated codes do not include a verifiable signature.

Although a privileged code generation capability may provide dynamic code generation for non-privileged processes, such an approach poses serious security risks by over exposing the system. Furthermore, a privileged process may be required to inject new codes without being able to cache and reuse codes as templates through trampoline.

Therefore, current approaches in executing dynamically generated functions fail to satisfy security requirements on executable codes in secure operating systems.

SUMMARY OF THE DESCRIPTION

An embodiment of the present invention includes a method and apparatus to perform a function based on an executable code in response to receiving a request including function parameters. The executable code may be validated when loaded in a memory according to a signature statically signed over the executable code. A data location in the memory for storing the function parameters may be determined according location settings included inside the executable code. A target code location for storing a copy of the executable code may be determined based on the location settings and the determined data location. A function is performed by executing the executable code from the target code location referencing the stored function parameters.

In an alternative embodiment, a memory allocation request is sent to allocate a memory region in response to receiving a request to execute an executable code stored at a code location in a memory. The executable code may be validated according to a signature statically signed over the executable code. Subsequently, the executable code may be mapped into a code region within the memory region from the code location. A function is performed by executing the mapped executable code from the code region.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and an apparatus for dynamically generating signed codes are described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The term "host" and the term "device" are intended to refer generally to data processing systems rather than specifically to a particular form factor for the host versus a form factor for the device.

According to certain embodiments, executable codes are generated at runtime by copying and reassembling necessary pieces of codes built and signed statically. Executable codes with signatures may be validated when loaded in to a memory. During runtime, the executable codes are not changed and remain signed. Normal memories allocated with write privileges but without executable privileges are paired with assembled executable codes (in executable memory) as buddy pages. Mutable data needed by assembled executable codes may be held in paired buddy pages. Executable codes may be paired to buddy pares according to locations. As a result, copying executable codes to new locations (in the buddy memory) can result in executable codes performing new functions according to corresponding data held in paired buddy pages. An assembled executable code may locate its matching data in a paired buddy page based on where the assembled executable code is located in a memory. This approach can be employed in a system which does not allow allocation of memory in a heap to contain executable codes.

In another embodiment, an association between a data page and a code page may accelerate the performance of a finite state machine and interpreters, such as Java and/or JavaScript, by providing a mechanism writing optimized code for critical paths into an interpreted environment in an arbitrary manner. For example, an association of a data page and a code page may generate traditional free form code (e.g. one instruction and one jump per page) in a 64 bit environment. A full breadth of dynamic code generation may be performed by linking a privileged process and a non-privileged process by securely isolating the ability to create dynamic code to the privileged process.

Figure 1:
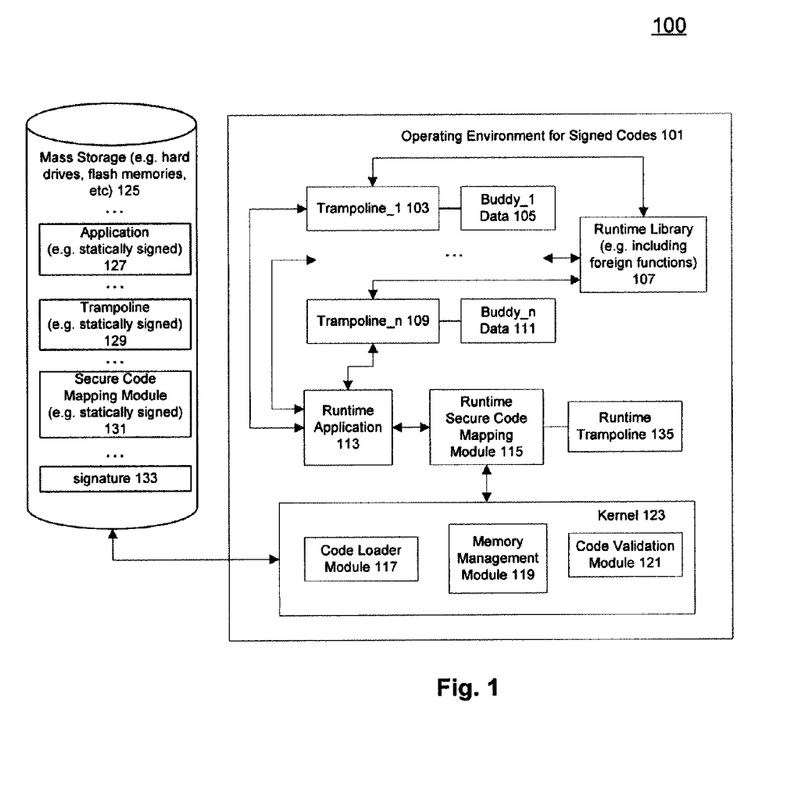
FIG. 1 is a block diagram illustrating one embodiment of system components to dynamically generate signed codes.

FIG. 1 is a block diagram illustrating one embodiment of system components to dynamically generate signed codes. System 100 may include an operating environment for signed codes 101, such as, for example, in an iPhone operating system for a cell phone device or a MAC operating system for a desktop. In one embodiment, operating environment 101 validates an executable code before loading the executable code into a memory for execution. A code may be statically signed with a cryptographic signature, such as an RSA (Ron Rivest, Adi Shamir, and Leonard Adleman) signature based on MD5 (Message Digest Algorithm 5) hash function. An operating environment 101 may include cryptographic keys, such as public or private keys, distributed over a public key infrastructure for validating an executable code. In some embodiments, an executable code (e.g. without a signature) is loaded into the memory for execution without validation.

A mass storage 125 may be coupled with an operating environment 101 to store signed codes for execution. For example, a single signature, such as signature 133, may be signed over an application code, such as application 127, together with static or dynamic library codes, such as a trampoline 129 and/or a secure code mapping module 131, built for the application code. A mass storage 125 may be a persistent storage device such as a hard drive or a flash memory. In some embodiments, library codes to be linked with application codes may be signed with separate signatures. An executable code, such as application 127, trampoline 129, or secure code mapping module 131, may include header information for locating associated signatures.

An operating environment 101 may include a code loader module 117, a memory management module 119 and a code verification module 121 as part of a kernel 123 providing system services. A code loader module 117 may retrieve from external sources, such as a locally coupled mass storage device or a networked remote device, an executable code, such as application 127, together with required library codes, such as trampoline 129 and secure code mapping module 131, into a memory. In one embodiment, a code loader module 117 calls a code validation module 121 to validate a retrieved executable code before loading the executable code into a memory. A code validation module 121 may determine a validity of an executable code retrieved based on, for example, public key cryptography according to public/private keys stored within an operating environment 101 and a signature associated with the retrieved executable code. A memory management module 119 may provide memory allocation/de-allocation services for other modules, such as a code loader module 117 or a runtime application 113. A memory location may be allocated with different privileges, such as an execution privilege for an executable code or a write privilege for storing data.

In one embodiment, an application 127, a secure code mapping module 131 and a trampoline 129 are validated and loaded into an operating environment 101 as a runtime application 113, a runtime secure code mapping module 115 and a runtime trampoline 135 respectively. In response to calls from a runtime application 113, a secure code mapping module may dynamically request a memory management module 119 to map (or copy) a runtime trampoline 135 into a pool of trampolines, such as trampoline_1 103 and trampoline _n 109. In one embodiment, a secure mode mapping module 115 may allocate a buddy data area for each mapped trampoline, such as buddy_1 data 105 associated with trampoline_1 103 and buddy_n data 111 associated with trampoline_n 109. A runtime application 113 may update a buddy area associated with a trampoline.

As a result, when executed, separate trampolines, such as trampoline_1 103 and trampoline_n 109, both including same copy of executable codes from a loaded runtime trampoline 135, may perform functions with variations according to values of associated buddy data, such as buddy_1 data 105 and buddy_n data 111 respectively. In one embodiment, a trampoline may call a runtime library, such as runtime library 107, to support functions foreign to an application. A runtime library 107 signed with a signature for validation may be preloaded in an operation environment 101.

In some embodiments, a runtime trampoline 135 may be generated dynamically via a trusted (e.g. statically signed) dynamic code generating library. For example, a dynamic code generating library may generate different runtime trampolines to perform a variety of functions to support, for example, scripting languages, such as Javascript. A dynamic code generating library may be validated and pre-loaded in a system to generate codes in a designated memory area with special privileges controlled by the dynamic code generating library. In one embodiment, linking a non-privileged process (e.g. based on a trusted dynamic code generating library) with a privileged process (e.g. a daemon) performing traditional dynamic code generation to inject new mapped memory into a virtual memory space of the non-privileged process, such as a runtime trampoline 135, may achieve high performance integration via the memory mapping mechanism. In some embodiments, a privileged process can create new signed codes for a non-privileged process to load using a normal library based memory loading mechanism.

Figure 2:
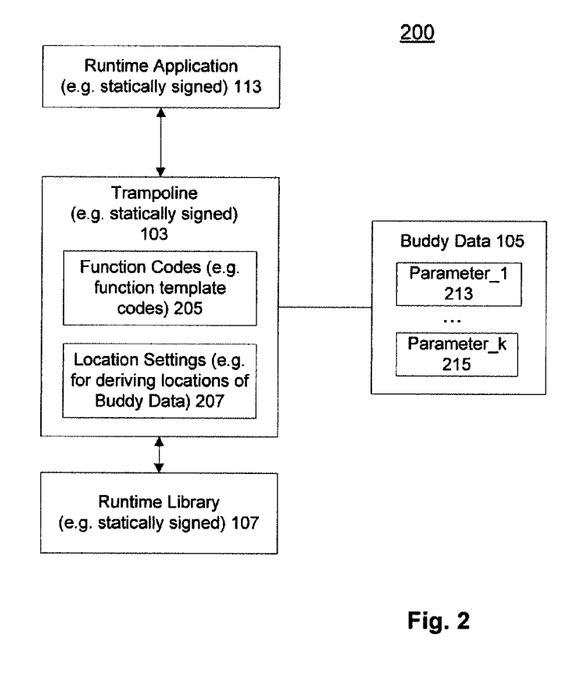
FIG. 2 is a block diagram illustrating one embodiment of dynamically generated signed codes.

FIG. 2 is a block diagram illustrating one embodiment of dynamically generated signed codes. System 200 may include a portion of system 100 of FIG. 1. A trampoline 103 may include executable codes mapped from a runtime trampoline, such as runtime trampoline 135 of FIG. 1, according to a code mapping module, such as mapping module 115 of FIG. 1, in response to a call from a runtime application 113. A buddy data 105 associated with a trampoline 103 may be allocated by a code mapping module. In one embodiment, a buddy data 105 includes one or more parameters, such as parameter_1 213 and parameter_k 215, having values set according to a runtime application 113. A trampoline 103 may include executable function codes 205 and location settings 207. For example, location settings 207 may be used to derive location offsets to locate parameters 213, 215 inside a buddy data 105 when executing function codes 205 from a trampoline 103. Function codes 205 may be function template codes.

Figure 3:
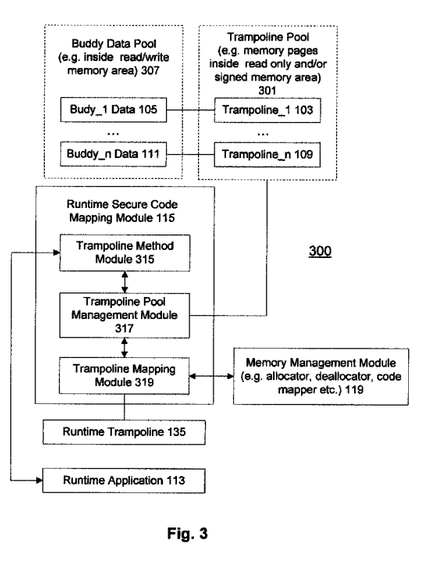
FIG. 3 is a block diagram illustrating one embodiment of system modules to dynamically generate signed codes via a memory pool.

FIG. 3 is a block diagram illustrating one embodiment of system modules to dynamically generate signed codes via a memory pool. System 300 may include a portion of system 100 of FIG. 1. In one embodiment, a runtime secure code mapping module 115 includes a trampoline method module 315 providing a service, e.g. an interface to a library of foreign functions, such as runtime library 107 of FIG. 1, to a runtime application 113. To perform a function in response to a request from a runtime application 113, a trampoline method may locate a function entry via a trampoline pool management module 317. A function entry may include an address to a trampoline or a memory area privileged for execution storing a copy of an executable runtime trampoline 135. A processor may execute executable codes stored in a memory space privileged for execution. Additionally, a trampoline pool management module 317 may identify a buddy data, such as buddy_1 data 105, associated with a trampoline, such as trampoline_1 103, for a function entry. A trampoline method module 315 may update a buddy data according to a request received from a runtime application 113 to customize or configure a function performed when executing codes (e.g. including a function template) inside a trampoline.

In one embodiment, a runtime secure code mapping module 115 includes a trampoline pool management module 317 managing a buddy data pool 307 and/or a trampoline pool 301. In some embodiments, a trampoline pool 301 may include memory pages inside a read only and/or signed memory area. A buddy data pool may include one or more buddy data, such as buddy_1 data 105 and buddy_n data 111, allocated in memory areas flagged with rights or privileges for read/write operations. Data stored in memory areas for read/write operations may not be executable. In one embodiment, each buddy data in a buddy data pool is of a predetermined size, for example, one page or 1 K bytes. A trampoline pool 301 may include one or more trampolines, such as trampoline_1 103 and trampoline_n 109, allocated in memory areas flagged with execution privilege for storing executable codes, such as copies of runtime trampoline 135. Each trampoline in a trampoline pool 301 may be paired with a corresponding buddy data in a buddy data pool 307. A trampoline pool management module may maintain more than on pairs of trampoline/buddy data to allow more than one copies of executable codes from a runtime trampoline 135 to be executed at the same time, each trampoline to perform a specific function according to each paired buddy data. In one embodiment, a trampoline pool management module 317 enforces a maximum number of trampolines allocated in a trampoline pool 301 according to system settings. A memory area allocated for a trampoline inside a trampoline pool 301 may be reused without additional memory allocation for a new request from an application when an execution of executable codes in the trampoline completes.

According to one embodiment, a trampoline pool management module 317 grows a trampoline pool 301 and/or a buddy data pool 307 via a trampoline mapping module 319. An entry to a trampoline pool 301 and a corresponding entry to a buddy data pool 307 may be allocated together. A trampoline mapping module 319 may send memory management requests, such as system API (application programming interface), to a memory management module 119 to allocate memory areas, such as trampoline_1 103 and/or buddy_1 data 105, for a trampoline pool 103 and/or a buddy data pool 307. A memory management request may allocate a memory area for data read/write, de-allocate a memory area and/or map an executable code to a certain memory area. A memory management module 119 may assign a privilege flag (e.g. an execution privilege or a read/write privilege) to an allocated memory area to indicate whether a memory area includes executable codes or read/write data. In one embodiment, a trampoline mapping module 319 determines relative location relationships between a trampoline and a paired buddy data according to location settings, such as, for example, location settings 207 of FIG. 2, in a runtime trampoline 135. A trampoline, such as trampoline_1 103, paired with a corresponding buddy data, such as buddy_1 data 105, may be allocated in two partitions of a consecutive memory area. For example, a trampoline_1 103 and a paired buddy_1 data 105 may be allocated in a first and second page of a two-page (e.g. 2 K bytes) memory area respectively.

Figure 4:
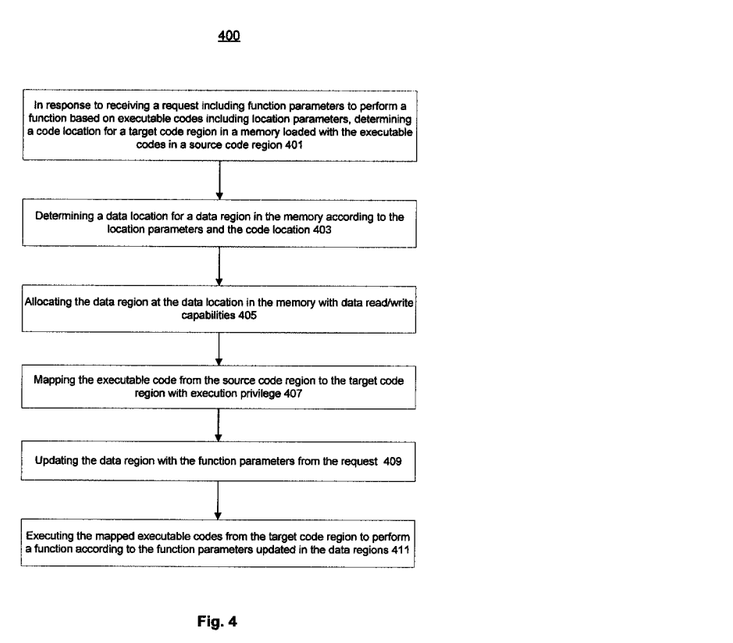
FIG. 4 is a flow diagram illustrating an embodiment of a process to dynamically generate signed codes.

FIG. 4 is a flow diagram illustrating an embodiment of a process to dynamically generate signed codes. Exemplary process 400 may be performed by a processing logic that may include hardware (circuitry, dedicated logic, etc.), software (such as is run on a dedicated machine), or a combination of both. For example, process 400 may be performed by system 100 of FIG. 1. At block 401, according to one embodiment, the processing logic of process 400 determines a code location for a target code region in a memory in response to a request including function parameters to execute executable codes loaded in the memory. A request may be received from a runtime application, such as runtime application 113 of FIG. 1. Executable codes may be statically signed codes loaded in a source code region in a memory, such as runtime trampoline 135 of FIG. 1. In one embodiment, function parameters are parameters for calling a foreign function in a runtime library, such as runtime library 107 of FIG. 1. A target code region may have a size large enough to accommodate statically signed executable code. In one embodiment, the size of a target code region may be predetermined based on page sizes of a memory, e.g. one page or two pages of memory.

Location settings may specify, for example, relative locations to locate function parameters, such as parameter_1 213 and parameter_k 215 of FIG. 2, stored in a buddy data, such as buddy data 105, from a paired trampoline, such as trampoline_1 103 of FIG. 2. Executable codes may explicitly include location settings as part of statically signed codes. A location parameter may specify, for example, a start address for locating function parameters as one page size (e.g. 1 K bytes) before or after a code location according to a memory area layout. The processing logic of process 400 may determine a code location based on available memory areas allocated for a pool, such as in trampoline pool 301 of FIG. 3.

At block 403, according to one embodiment, the processing logic of process 400 determines a data location for a data region in a memory according to the determined target code location and the location settings included in the loaded executable codes. For example, location settings may include a location offset for an executable code executed from a code region at a determined target code location to retrieve a parameter value. An offset may refer to one memory page (e.g. 1 K bytes) before or after a code location. In some embodiments, location settings may define location relationships between memory regions. The processing logic of process 400 may determine to locate a data region which is related to a target code region according to location settings. In one embodiment, a data region and a target code region may be adjacent to each other in a memory space, for example, based on a virtual memory map over an actual physical memory.

The processing logic of process 400 may allocate a data region with read and/or write privilege or capabilities at a determined data location at block 405. In one embodiment, the processing logic of process 400 sends API calls to a memory management module, such as memory management module 119 of FIG. 1, to allocate a data region, such as buddy data 105 of FIG. 2. Typically, data stored in memory locations with read/write privileges may not be executable. At block 407, the processing logic of process 400 may map executable codes from a source code region to a target code region. In one embodiment, executable codes are copied from a source code region to a target code region during mapping. Alternatively, entries to a virtual memory may be updated for mapping codes. A target code region may be flagged as privileged for execution to store executable codes. The processing logic of process 400 may send requests including parameters for a target code region (e.g. locations, sizes etc.) to a memory management module, such as memory management module 119 of FIG. 1, for mapping executable codes.

At block 409, according to one embodiment, the processing logic of process 400 updates the allocated data region with function parameters included in a request for performing a function. The processing logic of process 409 may determine a location within the allocated data region to store a function parameter according to location settings inside executable codes. For example, a location setting may include a relative location from within a target code region to access a function parameter in a data region. In one embodiment, the processing logic of process 400 stores more than one function parameters identified from a received request along consecutive memory locations within a data region. At block 411, the processing logic of process 400 executes from a target code region mapped executable codes to perform a function customized according to function parameters updated in an allocated data region. In one embodiment, executing mapped executable codes may retrieve function parameters from a data region to call a foreign function in a runtime library, such as foreign function run time library 107 of FIG. 1. A foreign function may require extra parameters provided by the mapped executable codes in addition to function parameters stored in a data region. In one embodiment, after executable codes in a target code region have been executed, the processing logic of process 400 notifies a pool management module, such as trampoline pool management module 317 of FIG. 3, the availability of both a target code region and a corresponding data region.

In some embodiments, the process 400 may be performed using system mechanisms such as vm_remap( )on Mach based operating systems (e.g. MacOS X, iPhone OS), mmap( )on POSIX compliant systems (e.g. BSD, Linux) or MapViewOfFileEx( )on Windows based operating systems. Alternatively, the processing logic of process 400 may employ DLL (Dynamic Link Library), shared libraries or plugin modules for loading separate code files.

Figure 5:
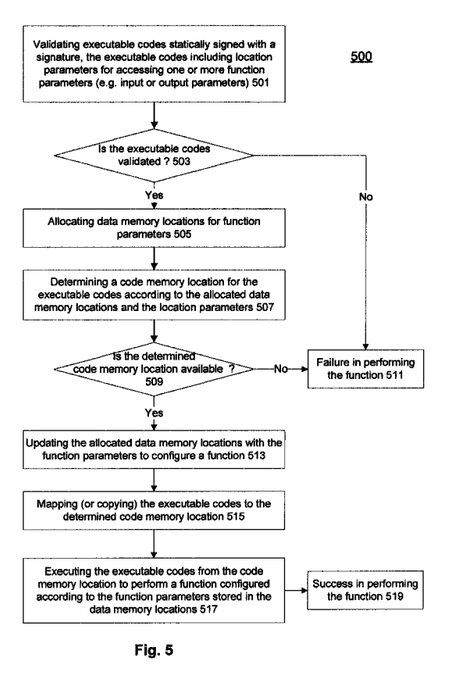
FIG. 5 is a flow diagram illustrating an embodiment of a process to dynamically generate signed codes according to location relationships.

FIG. 5 is a flow diagram illustrating an embodiment of a process to dynamically generate signed codes according to location relationships. Exemplary process 500 may be performed by a processing logic that may include hardware (circuitry, dedicated logic, etc.), software (such as is run on a dedicated machine), or a combination of both. For example, process 500 may be performed by system 100 of FIG. 1. At block 501, according to one embodiment, the processing logic of process 500 validates executable codes according to a signature statically signed over the executable codes, such as, for example, received from a network connection or retrieved from a storage device, such as mass storage 125 of FIG. 1. The processing logic of process 500 may generate a hash value over the executable code to compare with a signed signature (e.g. decrypted according to a public key associated with the executable codes) to perform validation. In some embodiments, the processing logic of process 500 may decrypt executable codes according to a unique device identifier associated with a device when performing validation. Executable codes may include location settings for locating one or more function parameters when the executable codes are executed. The processing logic of process 500 may identify location settings directly from validated executable codes. Alternatively, location settings may be predetermined. If the executable codes are not validated at block 503, the processing logic of process 500 may not execute the executable codes, thus no function is performed at block 511.

If the executable codes are successfully validated at block 503, the processing logic of process 500 may allocate data memory locations for function parameters at block 505. In some embodiments, function parameters are identified from a request received for performing a function associated with executable codes, such as from a runtime application 113 of FIG. 1. The processing logic of process 500 may determine relationships among data memory locations according to location settings. For example, data memory locations may form an array of two integers. In one embodiment, the processing logic of process 500 requests allocation of data memory for function parameters via system APIs.

At block 507, the processing logic of process 500 may determine a code memory location for executing executable codes according to allocated data memory locations and identified location settings. A code memory location may be the address of the first entry to executable codes stored. Location settings may be used to derive a location to address a first function parameter relative to a code memory location. A relative location may be based on the size of executable codes or a predetermined fixed number such as a memory page size. If the determined code memory location is not available at block 509, the executable code may not be executed to perform a function at block 511. In one embodiment, the availability of a code memory location is determined by a memory management module, such as memory management module 119 of FIG. 1.

If the determined code memory location is available at block 509, the processing logic of process 500 may update the allocated data memory locations with values of function parameters to configure a function associated with the validated executable codes at block 513. The processing logic of process 500 may map or copy the executable codes to a determined code memory location at block 515. In some embodiments, mapping executable codes to a code memory location may determine whether a code memory location is available for storing executable codes. At block 517, the processing logic of process 500 may execute the executable codes from a code memory location to perform a function configured according to function parameters stored in corresponding data memory locations. In some embodiments, multiple copies of validated executable codes mapped into different code memory locations are executed at the same time to perform separate functions configured by corresponding function parameters stored at separate data memory locations. The processing logic of process 500 returns with success from performing a function at block 519.

Figure 6:
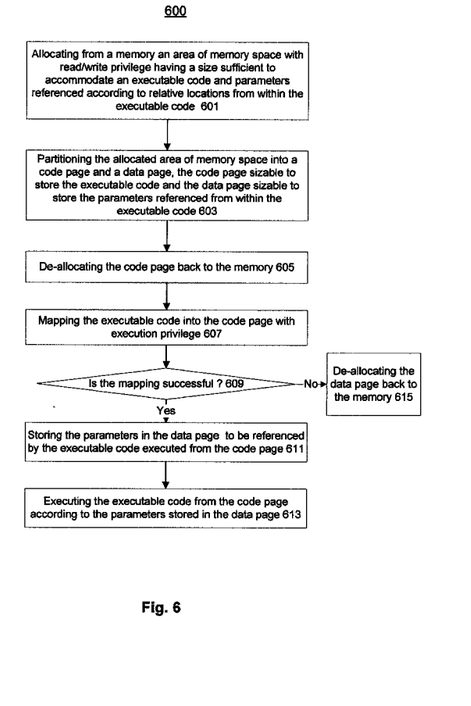
FIG. 6 is a flow diagram illustrating an embodiment of a process to allocate memories to generate signed codes dynamically.

FIG. 6 is a flow diagram illustrating an embodiment of a process to allocate memories to generate signed codes dynamically. Exemplary process 600 may be performed by a processing logic that may include hardware (circuitry, dedicated logic, etc.), software (such as is run on a dedicated machine), or a combination of both. For example, process 600 may be performed by system 100 of FIG. 1. At block 601, according to one embodiment, the processing logic of process 600 may allocate from a memory an area of memory space sizable to accommodate an executable code and one or more parameters referenced according to relative locations from within the executable code. In one embodiment, the processing logic of process 600 allocates an area of memory space with read/write privilege. For example, the processing logic of process 600 may allocate two pages of memory space (e.g. 2K bytes) with read/write privileges for a statically signed executable code less than 1K in size.

At block 603, the processing logic of process 600 may partition an allocated area of memory space with read/write privilege into a code page and a data page. A code page may be sizable to store an executable code. A data page may be sizable enough to store parameters referenced from within an executable code stored in a code partition. For example, an allocated memory area with 2K bytes in size may be partitioned into 1K bytes as a code page and the reset 1K bytes as a data page. However, other uneven partitions are possible. In one embodiment, at block 605, the processing logic of process 600 may de-allocate the code partition from an allocated read/write memory area. A de-allocated code partition may not be accessible for data read/write. The processing logic of process 600 may send a memory de-allocation request to a memory management module, such as memory management module 119 of FIG. 1, to de-allocate a code partition.

At block 607, in one embodiment, the processing logic of process 600 maps a validated executable code loaded in a memory, such as a runtime trampoline 135 of FIG. 1, into a de-allocated code partition. The processing logic of process 600 may send a memory management request to copy an executable code into a de-allocated code page. A code page may store a mapped executable code with an execution privilege. In one embodiment, the processing logic of process 600 maps an executable code into a code page right after or substantially about the same time when the code page is de-allocated. If the mapping is not successful at block 609, the processing logic of process 600 may de-allocate a partitioned data page, hence returning back allocated memory space including both a code partition and a data partition, without executing an executable code.

If the mapping is successful at block 609, in one embodiment, the processing logic of process 600 stores parameters in the partitioned data page according to locations to be referenced when executing the executable code mapped into the partitioned code page at block 611. Locations to store parameters in a partitioned data page may be determined according to location settings (e.g. relative locations) in an executable code stored in a partitioned code page. At block 613, the processing logic of process 600 may execute an executable code from within a partitioned code page to perform a function configured according to parameters stored in the portioned data page referenced by the executable code from the partitioned code page.

Figure 7:
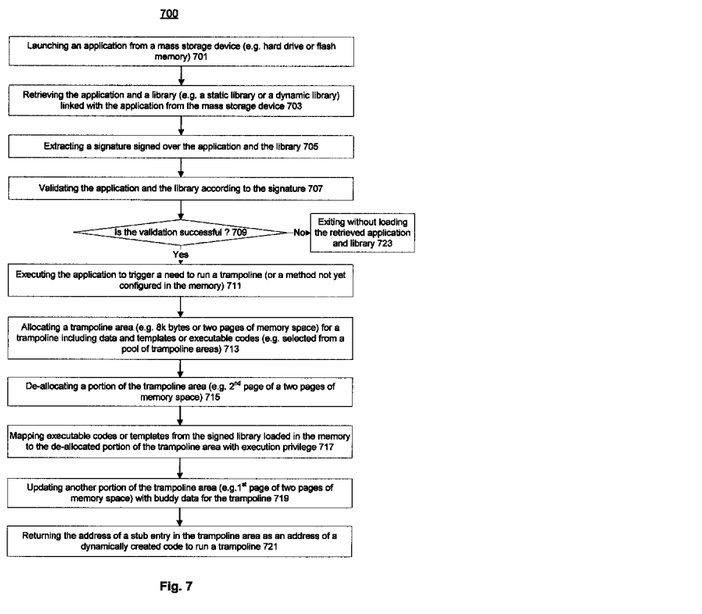
FIG. 7 is a flow diagram illustrating an embodiment of a process to dynamically generate signed trampolines.

FIG. 7 is a flow diagram illustrating an embodiment of a process to dynamically generate signed trampolines. Exemplary process 700 may be performed by a processing logic that may include hardware (circuitry, dedicated logic, etc.), software (such as is run on a dedicated machine), or a combination of both. For example, process 700 may be performed by system 100 of FIG. 1. At block 701, according to one embodiment, the processing logic of process 700 may launch an application linked with a (static or dynamic) library stored in a mass storage device, such as mass storage 125 of FIG. 1. The processing logic of process 700 may retrieve an application and its linked library from a mass storage device at block 703. Alternatively, the processing logic of process 700 may retrieve an application and a library from different devices or networked sources. At block 705, the processing logic of process 700 may retrieve a signature signed over the retrieved application and library from the same or separate devices storing the application. In one embodiment, an application retrieved is accompanied with a header for locating an associated signature. At block 707, the processing logic of process 700 may validate the retrieved application and library according to the signature based on, for example, public key cryptography. If the validation is not successful at block 709, the processing logic of process 700 may exit without loading the retrieved application and library at block 723.

According to one embodiment, if the validation is successful at block 709, the processing logic of process 700 may load the validated application and library into a memory to execute an application at block 711. The processing logic of process 700 may execute an application to trigger a need to run a trampoline for a foreign function or a method not yet configured in the memory. At block 713, the processing logic of process 700 may allocate a trampoline area (e.g. a predetermined size of memory space) for a trampoline to store executable codes and associated data to configure the executable codes, such as a template. A predetermined size of memory space may be, for example, two pages of memory, such as 2K bytes or two pages of memory. A template may be larger than one page of memory. Alternatively, the processing logic of process 700 may select a trampoline area from a pool of pre-allocated trampoline areas, such as, for example, a pair of trampoline_1 103 and buddy_1 105 of FIG. 1. A trampoline area may be flagged with read/write privilege but not execution privilege.

At block 715, in one embodiment, the processing logic of process 700 de-allocates a portion of the trampoline area, for example, the second page of a two-page memory space. The processing logic of process 700 may send a memory de-allocation request via system APIs to de-allocate a portion of the trampoline area to make it available for new allocation. Subsequently at block 717, the processing logic of process 700 may map executable codes (or template of codes) from the signed library loaded in the memory to the de-allocated portion of the trampoline area with execution privilege. In one embodiment, mapping an executable to a de-allocated memory area may be performed substantially at the same time when the memory area is de-allocated. The processing logic of process 700 may update another portion of the trampoline area, for example, the first page of a two-page memory space, with buddy data, such as buddy_1 data 105 of FIG. 1, for the trampoline to configure the mapped executable codes. Buddy data may be generated by an application when a need to run a trampoline is triggered. At block 721, the processing logic of process 700 may return the address of a stub entry in a trampoline area to mapped executable codes as an address of a dynamically created code to run a trampoline.

Figure 8:
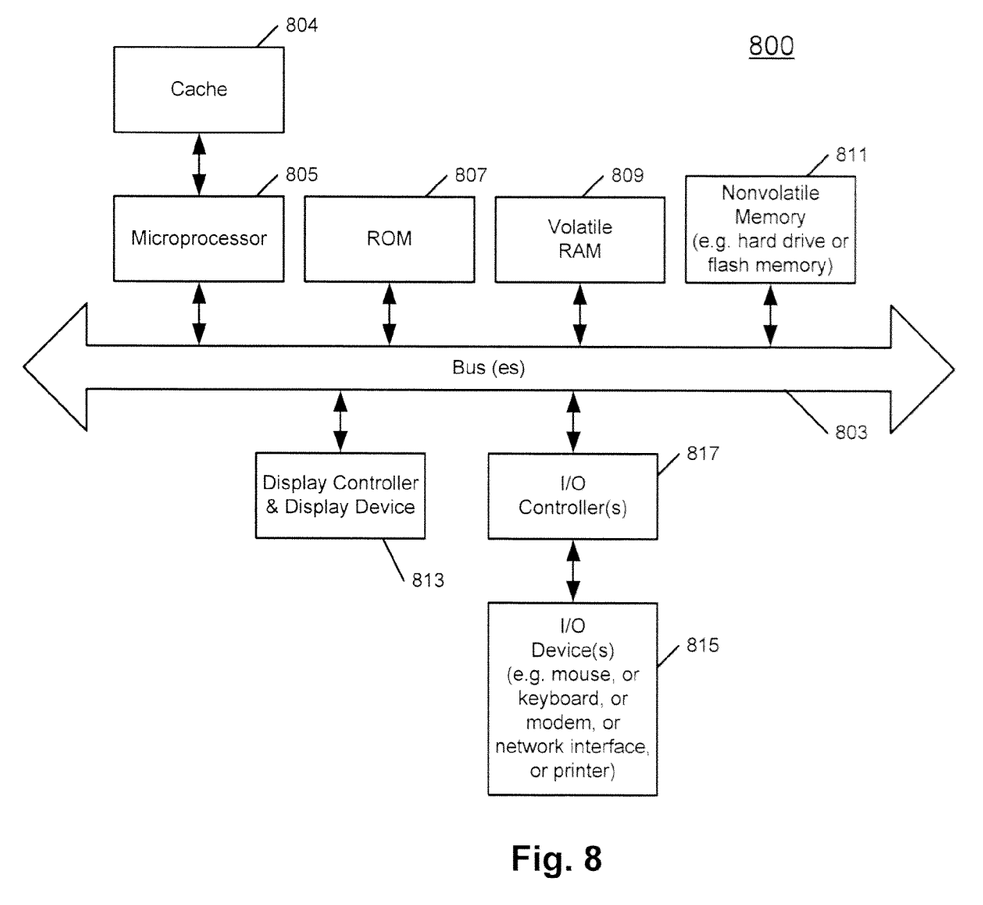
FIG. 8 illustrates one example of a typical computer system which may be used in conjunction with the embodiments described herein.

FIG. 8 shows one example of a data processing system which may be used with one embodiment the present invention. For example, the system 800 may be implemented including a host as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 817. The volatile RAM (Random Access Memory) 809 is typically implemented as dynamic RAM (DRAM) which requires power continually in order to refresh or maintain the data in the memory.

The mass storage 811 is typically a magnetic hard drive or a magnetic optical drive or an optical drive or a DVD RAM or a flash memory or other types of memory systems which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Figure 9:
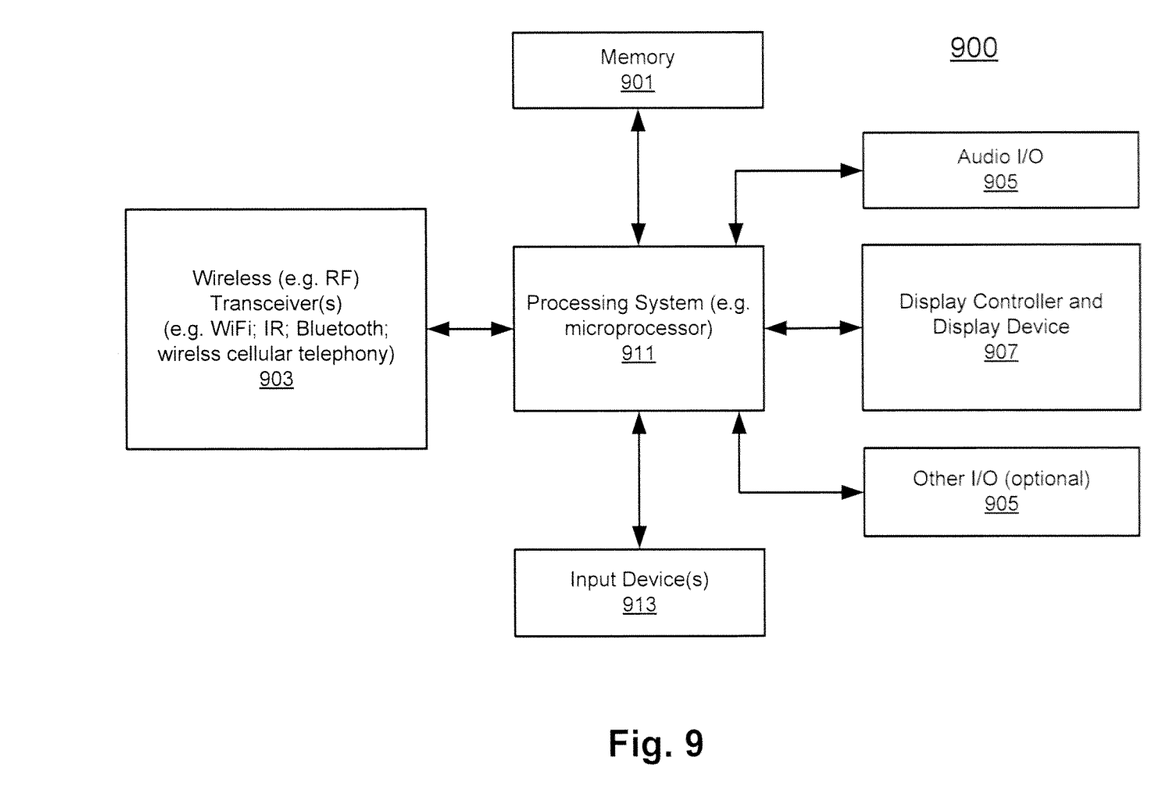
FIG. 9 shows an example of another data processing system which may be used with one embodiment of the present invention.

FIG. 9 shows an example of another data processing system which may be used with one embodiment of the present invention. For example, system 900 may be implemented as part of system as shown in FIG. 1. The data processing system 900 shown in FIG. 9 includes a processing system 911, which may be one or more microprocessors, or which may be a system on a chip integrated circuit, and the system also includes memory 901 for storing data and programs for execution by the processing system. The system 900 also includes an audio input/output subsystem 905 which may include a microphone and a speaker for, for example, playing back music or providing telephone functionality through the speaker and microphone.

A display controller and display device 907 provide a visual user interface for the user; this digital interface may include a graphical user interface which is similar to that shown on an iPhone phone device or on a Macintosh computer when running OS X operating system software. The system 900 also includes one or more wireless transceivers 903 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system.

The data processing system 900 also includes one or more input devices 913 which are provided to allow a user to provide input to the system. These input devices may be a keypad or a keyboard or a touch panel or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 900 may be a network computer or an embedded processing device within another device, or other types of data processing systems which have fewer components or perhaps more components than that shown in FIG. 9.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPhone, an iPod or iPod Nano media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer.

Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A computer implemented method, comprising:
  in response to receiving a request to execute an executable code configured by function parameters to perform a function, the executable code stored at a code location in a memory, sending a memory allocation request for a memory region within the memory, the memory region having access privilege to allow data read/write;
  partitioning he memory region into a data region and a code region, the data region sized to store the function parameters;
  sending a memory deallocation request to deallocate the code region to be inaccessible for data read/write;
  mapping the executable code into the code region within the memory region with execution privilege when the code region is deallocated; and
  executing the executable code from the code region configured by the function parameters stored in the data region to perform the function.

2. The method of claim 1, wherein the memory region is allocated with read/write privilege, wherein the mapping of the executable code comprises:
  sending a memory de-allocation request to de-allocate the code region from the memory region; and
  sending a memory mapping request to re-allocate the code region with the execution privilege for the executable code.

3. The method of claim 1, wherein the request includes the function parameters for the execution of the executable code, wherein the executable code includes location offsets, wherein the execution of the executable code comprises:
  determining data locations within the memory region according the location offsets relative to the code region; and
  updating the function parameters into the data locations within the memory region, wherein the function parameters are retrieved from the data locations during the execution based on the location offsets.

4. The method of claim 1, wherein the executable is associated with a signature statically signed over the executable code, further comprising:
  retrieving the executable code from a storage device;
  validating the executable code cryptographically according to the signature; and
  loading, if the executable code is validated, the executable code into the code location in the memory.

5. The method of claim 4, wherein the retrieval of the executable code is based on a network interface remotely coupled with the storage device.

6. The method of claim 1, wherein the executable code is generated dynamically by a code generation library, wherein the code generation library is associated with a signature statically signed over the code generation library.

7. A data processing system, comprising:
  a storage device storing an application code, executable codes linked with the application code and a signature statically signed over the application code and the executable codes;

a processor coupled to the storage device to execute instructions;

a memory coupled to the processor to store the instructions executed by the processor, wherein the instructions include:

a first executable code including location settings stored at a source code location in the memory, the first executable code being loaded from the executable codes in the storage device;

a second executable code stored at a target code location in the memory, the second executable code includes instructions of the first executable code;

a third executable code being loaded from the executable codes in the storage device, the third executable code to:

in response to receiving a request including function parameters to perform a function based on the first executable code, determine a data location in the memory for storing the function parameters,         determine the target code location in the memory according to the data location and the location settings, and         map the first executable to the target code location as the second executable code to perform the function referencing the stored function parameters;

a code loader module to retrieve the application code and the executable codes from the storage device into the memory; and     a code verification module to validate the retrieved application codes and the executable codes according to the signature.

8. A data processing system, comprising:

a memory storing a first executable code and a second executable code, the second executable code being stored at a code location; and a processor coupled to the memory to execute the first executable code to:

in response to receiving a request to execute the second executable code configured by function parameters to perform a function, send a memory allocation request for a memory region within the memory, the memory region having access privilege to allow data read/write,     partition the memory region into a data region and a code region, the data region sized to store the function parameters,     send a memory deallocation request to deallocate the code region to be inaccessible for data read/write,     map the second executable code into the code region within the memory region with execution privilege when the code region is deallocated, and     execute the second executable code from the code region configured by the function parameters stored in the data region to perform the function.

9. A machine-readable storage medium having instructions, which when executed by a machine, cause a machine to perform a method comprising:

in response to receiving a request to execute an executable code configured by function parameters to perform a function, the executable code stored at a code location in a memory, sending a memory allocation request for a memory region within the memory, the memory region having access privilege to allow data read/write;

partitioning the memory region into a data region and a code region, the data region sized to store the function parameters;

sending a memory deallocation request to deallocate the code region to be inaccessible for data read/write;

mapping the executable code into the code region within the memory region with execution privilege when the code region is deallocated; and     executing the executable code from the code region configured by the function parameters stored in the data region to perform the function.

\* \* \* \* \*